US010567478B2

(12) United States Patent
Robin et al.

(10) Patent No.: US 10,567,478 B2
(45) Date of Patent: Feb. 18, 2020

(54) METHOD FOR COMMUNICATING INFORMATION FROM RADIO FREQUENCY PERIPHERAL IDENTIFIERS

(71) Applicant: SES-imagotag, Incorporated, Nanterre (FR)

(72) Inventors: François Robin, Paris (FR); Philippe Bottine, Boulogne-Billancourt (FR)

(73) Assignee: SES-imagotag, Incorporated (FR)

( * ) Notice: Subject to any disclaimer, the term of this patent is extended or adjusted under 35 U.S.C. 154(b) by 417 days.

(21) Appl. No.: 14/900,938

(22) PCT Filed: Jul. 3, 2014

(86) PCT No.: PCT/EP2014/064223
§ 371 (c)(1),
(2) Date: Dec. 22, 2015

(87) PCT Pub. No.: WO2015/001039
PCT Pub. Date: Jan. 8, 2015

(65) Prior Publication Data
US 2016/0156701 A1 Jun. 2, 2016

(30) Foreign Application Priority Data
Jul. 3, 2013 (FR) ..................... 13 56499

(51) Int. Cl.
*H04L 29/08* (2006.01)
*G06K 19/07* (2006.01)
*G06Q 10/08* (2012.01)

(52) U.S. Cl.
CPC .......... *H04L 67/10* (2013.01); *G06K 19/0723* (2013.01); *G06K 19/0727* (2013.01); *G06Q 10/087* (2013.01)

(58) Field of Classification Search
CPC .... G06K 19/0727; G06Q 30/02; H04W 4/008
See application file for complete search history.

(56) References Cited

U.S. PATENT DOCUMENTS

2007/0016479 A1\* 1/2007 Lauper .................. G06Q 20/32
340/572.1
2012/0224076 A1\* 9/2012 Niedermeyer .......... G06K 7/01
348/211.2
(Continued)

FOREIGN PATENT DOCUMENTS

WO 2006035315 A1 4/2006

OTHER PUBLICATIONS

International Search Report for Application No. PCT/EP2014/064223 dated Sep. 9, 2014.
(Continued)

*Primary Examiner* — Bryan Lee
(74) *Attorney, Agent, or Firm* — Lerner, David, Littenberg, Krumholz & Mentlik, LLP (57) ABSTRACT

The invention relates to a method for communicating data representative of information associated with a radio frequency peripheral to a mobile terminal, comprising the following steps: —the mobile terminal acquires a radio frequency peripheral identifier, —the mobile terminal emits a primary request comprising first characteristic information derived from said radio frequency peripheral identifier to a primary server, —the mobile terminal receives sign information associated with said first characteristic information from the primary server in response to the primary request, —the mobile terminal emits a secondary request comprising second characteristic information derived from said radio frequency peripheral identifier to a secondary server, —the mobile terminal receives data representative of information associated with said radio frequency peripheral from the secondary server in response to the secondary request.

16 Claims, 3 Drawing Sheets (56) References Cited

U.S. PATENT DOCUMENTS

2013/0040561 A1* 2/2013 Conde e Silva ...... H04W 4/001
                                                    455/41.1
2013/0047034 A1* 2/2013 Salomon ................ H04W 4/00
                                                    714/18

OTHER PUBLICATIONS

French Search Report for Application No. FR1356499 dated Jan. 20, 2014.

* cited by examiner

METHOD FOR COMMUNICATING INFORMATION FROM RADIO FREQUENCY PERIPHERAL IDENTIFIERS

CROSS REFERENCE TO RELATED APPLICATIONS

The present application is a national phase entry under 35 U.S.C. § 371 of International Application No. PCT/EP2014/064223, filed Jul. 3, 2014, published in French, which claims priority from French Patent Application No. 1356499, filed Jul. 3, 2013, the disclosures of which are incorporated by reference herein.

GENERAL TECHNICAL FIELD AND BACKGROUND OF THE INVENTION

The present invention generally concerns the display of information in a sales area.

The display of information relating to items presented for sale in a sales area is generally done by means of labels, particularly displaying the price of the item with which a label is associated, as well as other information such as the price per weight etc.

The need to possess an updated display of information has been the reason for the installation in many sales areas of electronic shelf labels, wherein the display of information on a screen of these electronic shelf labels is remote-controlled.

The usefulness of such systems is basically that they allow, in the shelves of a site such as a supermarket, hypermarket or any other sales area, the presentation to the consumer, for each item offered for sale, of a price reliably corresponding to the price as it features in the central file of the site, i.e. to the price as will be effectively used for the payment of the item.

Another advantage of these known systems is that they enable automated price changes to be made in much shorter times than with a manual display, whether it is for particular promotional periods on the site, for all or part of the items offered for sale, as an effect of pricing changes, to respond to situations of inflation in which prices must be increased very frequently etc.

Moreover, in matters of price displays there are many restrictions, particularly legal ones, as to the nature of the prices displayed (unit price, promotional price etc.) that must be observed by the electronic systems in the same way as paper displays.

Thus, electronic shelf label systems, although becoming more and more sophisticated over time, still remain relatively rigid as to the various display options, and as to the organization of these various options in time and space.

Furthermore, these electronic shelf labels only allow the display of information relating to the item with which each one of them is associated, and what is more, of information generally limited to the prices displayed by the labels.

The emergence of electronic commerce has accustomed the consumer to information that is detailed and/or specifically intended for the consumer. However, the display of this information currently practiced in sales areas is of necessity limited and does not offer any interaction with the consumer to which these items are offered for purchase.

Alternative information systems have been developed to palliate these problems, and in particular to make detailed information about a product selectively accessible to a consumer. However, these solutions are usually only applicable to a distribution store chain to which they are dedicated, or even to a single particular sales area.

For example, the patent application WO2006/035315 A1 presents a method wherein a terminal reads a piece of information on a radio-frequency chip, and calls an application of the terminal on the basis of the information read. The terminal application defines the type of product information which will be provided to the terminal. The terminal application decodes the piece of information and initiates a communication with a server to retrieve a URL representing the site of the data to be provided.

For this method however, the terminal must possess, internally, all the data allowing it to decode the information of the radio-frequency chip. It is therefore necessary for the application of the terminal to possess a database covering all the radio-frequency chips liable to be encountered, and for this database to be up-to-date. In practice, the requirements regarding the terminal are such that it can only be intended for professional uses, and not for simple customers of a sales area using a personal terminal. Moreover, the choice of the terminal application is made on the basis of the piece of information read. This read piece of information must thus be standardized to allow choice of the application, which complicates the management of the information contained in the radio-frequency chip.

The patent application US 2007/0016479 describes a method for obtaining information about a product from an identifier contained in an RFID tag. After acquisition of the identifier, the terminal sends a first request to a server which redirects the request to a directory, and in response the server receives the address of the corresponding page, then accesses the desired page via the server.

However, this method only allows access to a remote resource, and does not make it possible to select the launching of an application linked to a particular store chain. Thus, there may be an operation by the user may be required when several resources are available, for example via selection from a menu, which complicates the task of the user.

The methods of the prior art are thus not adapted to use by a customer of a sales area. This is because they require a priori knowledge of the context allowing the information to be retrieved, and thus prior configuration, which is possible for a professional use such as inventories, but is not desirable for a customer. In particular, the known methods are adapted to a particular environment, i.e. one specific to a store chain, but cannot be implemented independently from the store chain of the sales area. Moreover, the data of a store chain are in general only accessible by an application dedicated to said store chain. As a consequence, it is not possible to use the methods of the prior art in different stores.

Due to this fact, when a customer acquires a piece of information from a radio-frequency peripheral, there is no indication of the sales area in which he/she is found in the absence of prior configuration. It is thus only possible to retrieve the final data by involving the customer, for example by launching beforehand the application dedicated to the store chain of the sales area in which he/she is found, or else by choosing the store chain via a menu. There is therefore a need for a method that allows the customer to obtain the desired data without any operation on their part other than the reading of a radio-frequency device.

PRESENTATION OF THE INVENTION

The present invention thus aims to propose a means for supplying to a consumer information that is supplementary to the information already visually available in a sales area by means of a form of access controlled by the distribution store chain associated with the sales area, without the need for the consumer to perform an operation. Another objective is to be able to provide to the consumer, at the place of sale, information intended specifically for this consumer and personalized for him/her. Another subject of the invention aims to propose a means for supplying information to a consumer according to the precise context (place, time, interest etc.) of the consumer, and in particular localized in space and time.

For this purpose, according to a first aspect provision is made for a method for communicating to a mobile terminal data representing a piece of information associated with a radio-frequency peripheral in an area equipped with a series of radio-frequency peripherals, each radio-frequency peripheral being identified by a unique radio-frequency peripheral identifier which is specific to it, said mobile terminal executing a primary application and possessing several secondary applications each associated with a piece of store chain information, said method comprising at least the steps in which:

the mobile terminal sets up a communication via radio-frequency with a radio-frequency peripheral, the mobile terminal receives from the radio-frequency peripheral the radio-frequency peripheral identifier of said radio-frequency peripheral, the primary application generates a primary request including a first characteristic information derived from said radio-frequency peripheral identifier and the mobile terminal emits said request to a primary server, the mobile terminal receives from the primary server a piece of store chain information associated with said first characteristic information in response to the primary request, the primary application selectively starts a secondary application as a function of the piece of store chain information associated with said first characteristic information, the secondary application generates a secondary request including a second characteristic information derived from said radio-frequency peripheral identifier and the mobile terminal emits said secondary request to a secondary server, said secondary server being selected on the basis of the piece of store chain information, the mobile terminal receives from the secondary server data representing a piece of information associated with said radio-frequency peripheral in response to the secondary request.

The invention allows the communication of a sales area of any store chain to obtain data about a product associated with the label without any other intervention that the reading of a radio-frequency peripheral by means of his/her mobile terminal. The method allows the terminal to identify the adequate store chain by a first request to a primary server, therefore without the need for prior information, and to launch the corresponding secondary application, which will be able to go and search for the data specific to each store chain. The same method can thus be implemented in different stores belonging to different store chains.

The invention according to the first aspect is advantageously but optionally completed by the following features, taken alone or in any one of their technically possible combinations:

the emission of the primary request is hence conditional on the fact:

that a determined time period has elapsed since the last interaction between the mobile terminal and a primary or secondary server, or that a secondary request has not been satisfied;

prior to the emission of the primary request, the mobile terminal emits a secondary request including a second characteristic information derived from said radio-frequency peripheral identifier to a secondary server, said secondary server being selected on the basis of a piece of store chain information available beforehand for the mobile terminal typically, by default the last store chain visited;

if a determined time period has elapsed since the last interaction between the mobile terminal and a secondary server or a primary server, the mobile terminal emits a primary request including a first characteristic information derived from the radio-frequency peripheral identifier to the primary server;

if the mobile terminal does not receive data representing a piece of information associated with a radio-frequency peripheral in response to a secondary request, said mobile terminal emits a primary request including a first characteristic information derived from said radio-frequency peripheral identifier to the primary server;

notwithstanding the emission or otherwise of a primary request, the mobile terminal emits a secondary request including a second characteristic information derived from said radio-frequency peripheral identifier to a secondary server, said secondary server being selected on the basis of a piece of store chain information available beforehand for the mobile terminal;

following the reception by the mobile terminal of the piece of store chain information associated with said first characteristic information in response to the primary request, said mobile terminal directly emits communications including second characteristic information derived from said radio-frequency peripheral identifier to the secondary server for the radio-frequency peripheral identifiers subsequently received by the mobile terminal;

the radio-frequency peripheral identifiers subsequently received by the mobile terminal are stored in a memory of said mobile terminal, said radio-frequency peripheral identifiers being time-stamped by the association of a piece of time information to with each of said radio-frequency peripheral identifiers subsequently received;

said time-stamped radio-frequency peripheral identifiers can be transmitted to the primary server at the same time as a primary request;

the mobile terminal executes a primary application, said primary application being particularly configured to:

generate the primary request including the first characteristic information to the primary server, selectively start a secondary application as a function of the piece of store chain information associated with said first characteristic information;

the secondary application is particularly configured to generate the secondary request including the second characteristic information to the secondary server;

the secondary application is associated with a plurality of secondary servers, the secondary server for which the secondary request is intended being selected on the basis of the piece of store chain information among said plurality of secondary servers with which the secondary application is associated;

the setting up of the communication between the mobile terminal and the radio-frequency peripheral comprises the steps in which:

the mobile terminal is brought close to the radio-frequency peripheral, so that the radio-frequency peripheral is within the range of electromagnetic waves emitted by the mobile terminal, and said radio-frequency peripheral is activated by the energy of the electromagnetic waves emitted by the mobile terminal in order to set up the communication via radio-frequency between the radio-frequency peripheral and the mobile terminal;

the mobile terminal communicates via the internet network with the primary server for the emission of the primary request including the first characteristic information and for the reception of the piece of store chain information associated with said first characteristic information;

the mobile terminal communicates via the internet network with the secondary server for the emission of the secondary request including the second characteristic information and for the reception of the data representing a piece of information associated with said radio-frequency peripheral.

The invention also concerns a computer program product comprising program code instructions for the execution of the steps of the method according to the invention, when said program is executed by a mobile terminal.

The invention also concerns a mobile terminal comprising:

means for communicating via radio-frequency with a radio-frequency peripheral, means for communicating with at least one primary server and at least one secondary server, data processing means, said mobile terminal being configured to implement the method according to the invention.

The invention also concerns a communication system comprising:

a mobile terminal according to the invention, a series of radio-frequency peripherals, each radio-frequency peripheral being identified by a unique radio-frequency peripheral identifier that is specific to it, and the mobile terminal can set up a communication with each radio-frequency peripheral to acquire the radio-frequency peripheral identifier of said radio-frequency peripheral, at least one primary server having access to a database comprising a plurality of first characteristic information derived from each radio-frequency peripheral identifier of said area, each of said first characteristic information being associated with a piece of store chain information, said primary server being configured to communicate, in response to a primary request including a first characteristic information derived from a radio-frequency peripheral identifier, the piece of store chain information associated with said radio-frequency peripheral identifier, at least one secondary server having access to a database comprising a plurality of second characteristic information derived from radio-frequency peripheral identifiers, each of said second characteristic information being associated with data representing a piece of information associated with a radio-frequency peripheral, said secondary server being configured to communicate, in response to a secondary request including a second characteristic information of said plurality of second characteristic information, the data representing a piece of information with which said second characteristic information is associated.

The invention notable aims to make it possible to communicate to the user of a mobile terminal data representing a piece of information associated with a radio-frequency peripheral by means of a single configuration of the mobile terminal, particularly in the case of a radio-frequency peripheral of an electronic shelf label, and this independently of the manual selection of the application of the particular distribution store chain to which the sales area, in which this electronic shelf label is found, is related. The invention therefore makes it possible to make this operation easier and more comfortable for the user.

Specifically, within the scope of the invention, the user does not have to make any distinction between the different distribution store chains, and it is enough for them to bring his/her mobile terminal closer to an electronic shelf label equipped with a radio-frequency peripheral; this is the method according to the invention which determines the appropriated distribution store chain and which conducts the setting up of the communication with the entities holding the information desired by the user, particularly by way of the launching of a fitting application specific to the distribution store chain thus determined.

PRESENTATION OF THE FIGURES

Other features, aims and advantages of the invention will become apparent from the following description, which is purely illustrative and non-limiting, and which must be read with reference to the appended drawings among which.

DETAILED DESCRIPTION

The following description will be given within the scope of a sales area equipped with a plurality of electronic shelf labels, each of these labels being equipped with a radio-frequency peripheral by means of which the invention is implemented. Thus, in the following description, each radio-frequency peripheral is associated in a one-to-one manner with an electronic shelf label of a sales area, and the radio-frequency peripheral identifier is a label identifier;

the data representing a piece of information associated with the radio-frequency peripheral is data representing a piece of information associated with the electronic shelf label.

Typically, it is possible to read in each radio-frequency peripheral a unique identifier (UID, or Unique Identifier Data) which is the series number of the radio-frequency peripheral, and/or a piece of information allowing the identification of the label. This piece of information allowing identification of the label is definitively attributed to the label during the manufacturing of said label, thus constituting an identifier of the label. This identifier is definitively stored in the memory in the radio-frequency peripheral. It can for example be composed of a prefix followed by the series number of the label forming the label identifier, such as www.SES-ESL.com/123456789, the suffix "www.SES-ESL.com" making it possible, when reading the radio-frequency peripheral, to recognize the identifier as being communicable to a primary server.

Specifically, by reason of the one-to-one character of the relationship between a radio-frequency peripheral and an electronic shelf label, and of the uniqueness of the identifier as much for the label as for the radio-frequency peripheral, a radio-frequency peripheral identifier can identify an electronic shelf label, and vice versa, an electronic shelf label can identify a radio-frequency peripheral, so that a radiofrequency peripheral is also a label identifier, and the data representing a piece of information associated with the radio-frequency peripheral is also data representing a piece of information associated with the electronic shelf label.

Figure 1:
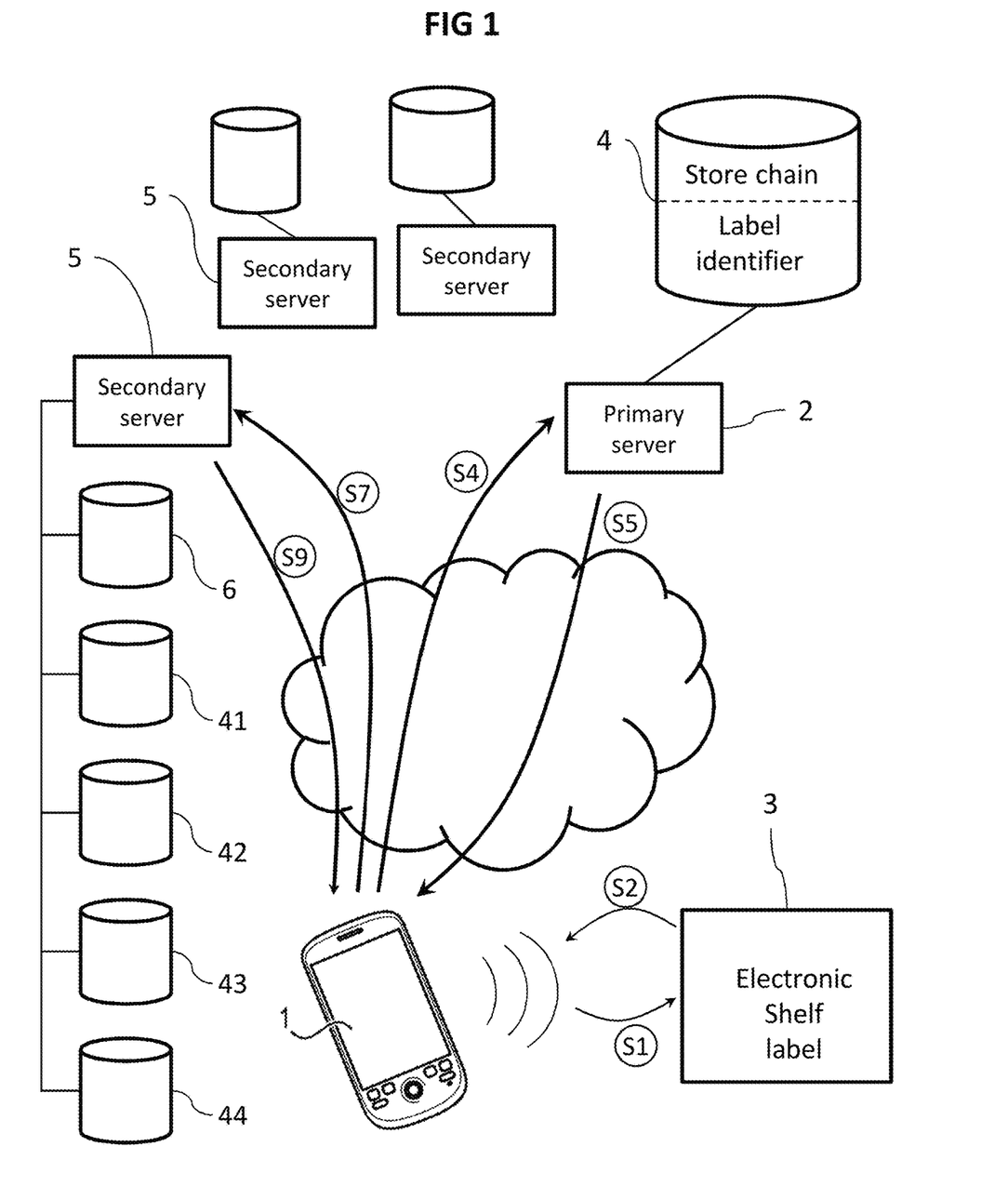
FIG. 1 is a diagram illustrating the system according to a possible embodiment of the second aspect of the invention.

FIG. 1 represents, for illustrative and non-limiting purposes, a communication system corresponding to a possible embodiment of the invention.

The illustrated system comprises a mobile terminal 1 comprising means for communicating via radio-frequency with a radio-frequency peripheral of an electronic shelf label 3, means for communicating with at least one primary server 2 and at least one secondary server 5, and also data processing means, typically a processor. This mobile terminal 1 is preferably equipped with information-displaying means, such as a screen, intended for a user of said mobile terminal 1. The communication between the mobile terminal 1 and the primary server 2 can be set up by means of any communication network, in particular wireless, for example via a wireless network of WiFi or 3G type. Thus the communication can be set up through the internet network to which the primary server 2 is linked. Similarly, the communication between the mobile terminal 1 and the secondary server 5 can be set up by means of any communication network, in particular wireless, for example via a wireless network of WiFi or 3G type. Thus the communication can be set up through the internet network to which the secondary server is linked.

In order to facilitate this communication, the sales area can have WiFi terminals setting up a connection between the mobile terminal 1 and the internet network to which the primary server 2 and the secondary server 5, for example, are connected.

A common example of such a mobile terminal 1 is a smart mobile phone known as a "smartphone", which simultaneously offers the possibility of connecting, processing and displaying appropriate information. Furthermore, the generalization of this type of telephone allows a large number of consumers to use their own mobile terminal 1. Other mobile terminals can be used as long as they meet the requirements of communicability with remote servers and for capacity to display information to their user. For example, a touch-sensitive tablet can be used as a mobile terminal 1.

The system also comprises a series of electronic shelf labels 3, each electronic shelf label 3 being identified by a unique label identifier that is specific to it. Typically, this label identifier is attributed to the electronic label at the time of its manufacturing, and cannot be modified. The electronic label 3 includes a radio-frequency peripheral 36 with which the mobile terminal 1 can set up a communication to acquire the label identifier of said electronic shelf label 3. This label identifier makes it possible to identify uniquely a single and unique shelf label 3 of the sales area. The series of electronic shelf labels 3 is distributed across the sales area, each electronic shelf label 3 being associated with a product of the sales area, displaying in particular the price and references of this product.

Figure 2:
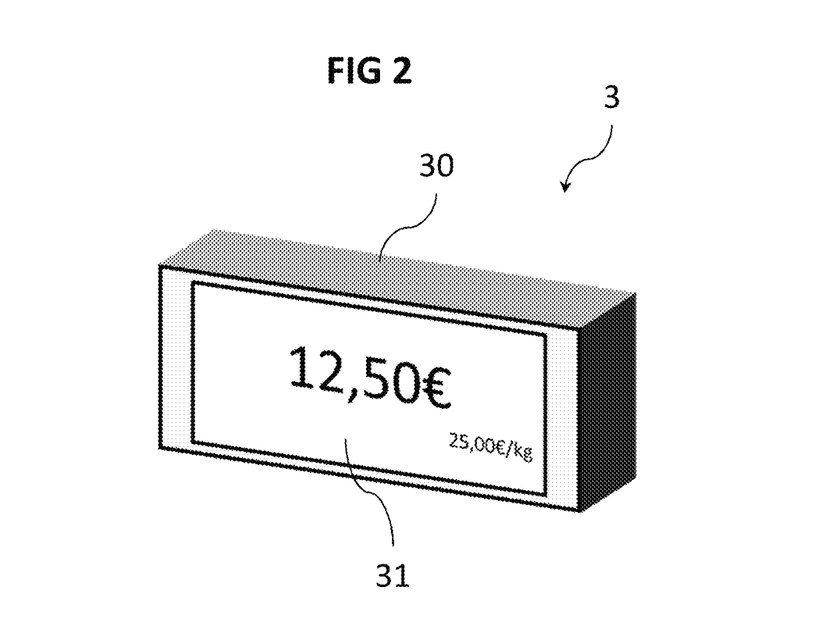
FIG. 2 is a diagram illustrating a front view of an electronic shelf label.
Figure 3:
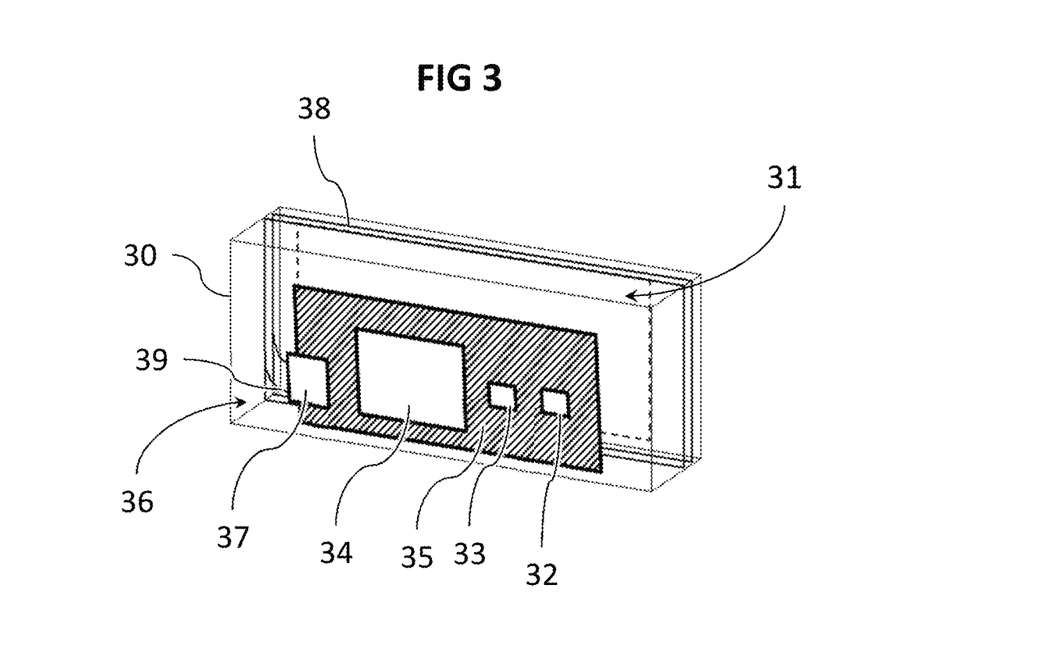
FIG. 3 is a rear transparency view of an electronic shelf label having a radio-frequency peripheral of a system according to the invention.

FIGS. 2 and 3 illustrate an example of an electronic shelf label 3 within the scope of the invention. Such an electronic shelf label includes a display screen 31 for displaying information related to an item with which it is associated. Typically, and as illustrated in FIG. 2, this information comprises the price of the item, and other information usually available in a sales area, for example the price per kilogram for a food product. The electronic shelf label also includes a plastic case 30 inside which the functional components of the electronic shelf label 3 are housed.

In particular, the electronic shelf label 3 includes a radio-frequency communication module 32 to receive data representing information relating to an item coming from a central station, a memory 33 to store said data, and a microcontroller 34 to control the display of the information related to the item.

These various functional components are disposed on a printed circuit board 35 housed in the case 30.

The electronic shelf label 3 of said series of electronic shelf labels also includes a radio-frequency peripheral 36 with which the mobile terminal 1 can set up a communication to acquire the label identifier of said electronic shelf label 3.

The radio-frequency peripheral 36 of the electronic shelf label 3 comprises an antenna 38 and an electronic chip 37 of NFC (Near Field Communication) or RFID (Radio-Frequency IDentification) type.

A radio-frequency peripheral of NFC type operates with a frequency of 13.56 MHz like a radio-frequency peripheral of HF RFID type.

A radio-frequency peripheral of NFC type corresponds to the ISO 14443 protocol, very secure with encryption. Communication by NFC is becoming widespread in personal mobile terminals such as mobile telephones, and as a consequence offers the advantage of mass deployment. Mobile terminals provided with NFC initially only supported the ISO 14443 protocol but new appliances are mainly bimodal and it is predicted that future development will be in the area of bimodality.

Since the application that is made thereof in electronic shelf labels 3 does not require a high level of security, a radio-frequency peripheral of ISO 15693 HF RFID type is perfectly suited to this use since its user-friendliness, along with its low cost, makes it more attractive.

Preferably, the chip 37 and the antenna 38 are arranged at different places on the electronic shelf label 3, connections 39 providing the link between the antenna 38 and the chip 37.

Still preferably, the chip 37 is connected to the microcontroller 34 of the electronic shelf label 3, and the antenna 38 is disposed on or in the case 30 inside which said microcontroller 34 is housed. Still preferably, the antenna 38 is disposed on the side of the front face of the electronic shelf label 3, toward its display screen 31, while the electronic chip 37 is disposed on the printed circuit board 35, on the side of the back face of the electronic shelf label 3.

Specifically, the integration of a radio-frequency peripheral 36 containing chip and antenna on one and the same support is not desirable on the front face of the electronic shelf label 3, as it can compromise the maximization of the display surface area of the display screen 31, particularly in order to allow the densification of the electronic shelf labels 3 on an item presentation shelf, especially in the case of small items.

Furthermore, the connection system between the electronic chip 37 and the microcontroller 34 can be complex and delicate to produce industrially at a modest cost. The chip 37 is then preferably embedded on the printed circuit board, thus facilitating the connection of the latter to the microcontroller 34.

However, a positioning of the antenna on the back face inside on the side of the chip 37 would reduce the distance and the reliability of reading since the latter would then have to be done through the display screen 31 of the electronic shelf label 3 (typically of a thickness of 1 cm) and the electromagnetic disturbances induced by the printed circuit board.

It is therefore preferable to separate the antenna 38 from the chip 37. The chip 37 is then preferably embedded on the printed circuit board, thus facilitating the connection of it to the microcontroller 34.

The antenna 38 is thus preferably integrated into the plastic case 30, to the front of the latter, preferably around the reserve receiving the display screen 31 and over-molded during injection at the time of manufacture of the case 30. The size of the antenna 38 can be maximized and thus increase the communication distance.

However, preferably, this communication distance with the radio-frequency peripheral 36 will be chosen relatively small, less than 20 cm, and preferably still less than 10 cm, with respect to the antenna 38.

Preferably, the mobile terminal 1 is adapted to transmit data to the electronic shelf label 3 via the radio-frequency peripheral 36 of said electronic shelf label 3. Thus, the display of the electronic shelf label 3 can be updated by the mobile terminal 1, for example when the mobile terminal 1 is used by an employee of the sales area.

According to an optional embodiment, the display of the electronic shelf label 3 can be modified during the communication with the mobile terminal 1. For example, it is possible to provide for the modification of the brightness of the display (flashing or intensity variation) or the display of particular information as long as a radio-frequency peripheral 36 communicates with a mobile terminal 1.

The system also comprises at least one primary server 2 having access to a database 4 comprising a plurality of first characteristic information, each derived from a label identifier of said sales area. Each of said first characteristic information is associated with a piece of store chain information, which piece of store chain information can be associated with several first characteristic information. Said first characteristic information allow each one to identify the radio-frequency peripheral or the electronic shelf label to which the identifier of the radio-frequency peripheral or label from which said first characteristic information is derived belongs. A first characteristic information is therefore characteristic of the radio-frequency peripheral and of the electronic shelf label. For example, the first characteristic information can be the label identifier, as it is, or else in a modified form.

The primary server 2 is configured to communicate, in response to a primary request including a first characteristic information among said plurality of first characteristic information, the piece of store chain information associated with said first characteristic information.

The system finally comprises at least one secondary server 5 having access to a database 6 comprising a plurality of second characteristic information derived from label identifiers, each of said second characteristic information being associated with data representative of a piece of information associated with an electronic shelf label. In the same way as the first characteristic information, the second characteristic information allow each one to identify the electronic shelf label with which the label identifier, from which is derived said second characteristic information, belongs. For a label identifier, the first characteristic information and the second characteristic information can moreover be identical. For example, the second characteristic information can be the label identifier, as such, or else in a modified form.

The secondary server 5 is configured to communicate, in response to a secondary request including a second characteristic information of said plurality of second characteristic information, the data representing a piece of information with which said second characteristic information is associated.

Figure 4:
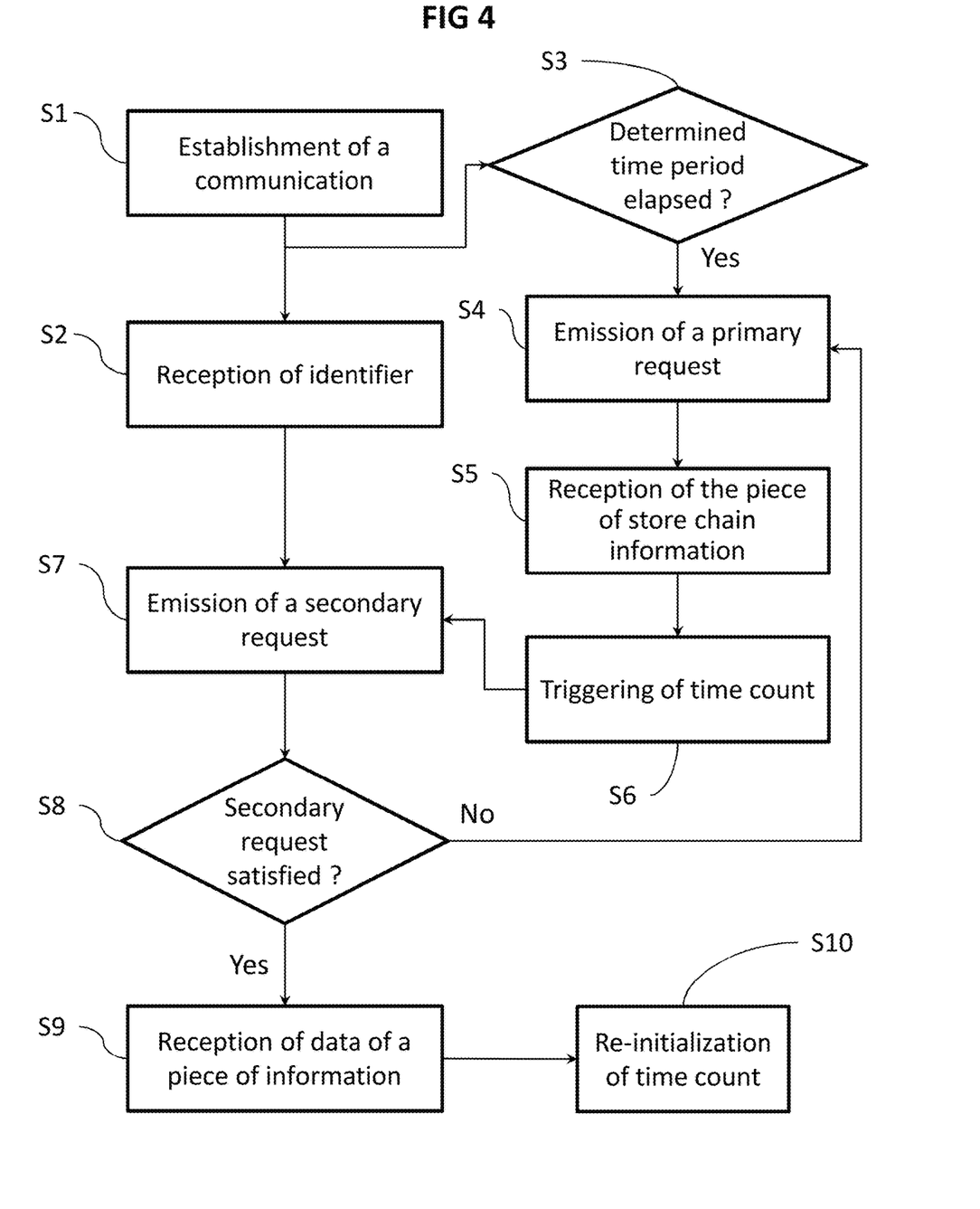
FIG. 4 is a diagram illustrating an example of a possible implementation of the method according to the invention.

The system for communicating data representing a piece of information associated with an electronic shelf label 3 in a sales area equipped with a series of electronic shelf labels 3 is configured to implement the method according to the invention, a possible embodiment of which will be described, particularly with reference to FIG. 4, illustrating an example of a possible implementation of the method according to the invention.

The method makes it possible to communicate data representing a piece of information associated with an electronic shelf label 3 to the mobile terminal 1. Firstly, the mobile terminal 1 sets up a communication via radio-frequency with a radio-frequency peripheral 36 of an electronic shelf label 3 (step S1.)

To do this, the mobile terminal 1 is brought close to the radio-frequency peripheral 36 of the electronic shelf label 3, so that the radio-frequency peripheral 36 is within range of the electromagnetic waves emitted by the mobile terminal 1.

The radio-frequency peripheral 36 is then activated by the energy of the electromagnetic waves emitted by the mobile terminal 1 in order to set up a communication via radio-frequency with the radio-frequency peripheral 36 of the electronic shelf label 3.

The mobile terminal 1 receives from the radio-frequency peripheral 36 of said electronic shelf label 3 the label identifier of said electronic shelf label 3 (step S2.) This label identifier can be communicated alone, or accompanied by other information, or else again by the communication of data, which are at least partly generated from said identifier, and which make it possible to identify the electronic shelf label 3 in the sales area. Typically, the label identifier received by the mobile terminal 1 comprises an indication identifying the data received as constituting a label identifier. This can for example be a series of characters characterizing a label identifier. The indication therefore makes it possible to recognize that it is a label identifier and to process it as a label identifier.

The mobile terminal 1 executes a primary application, for example by means of an operating system on board the mobile terminal 1. This primary application is for example middleware, software that serves as an intermediary between IT applications. This primary application can be active before the detection of a radio-frequency peripheral 36 of an electronic shelf label 3, or else be started in response to the reception by the mobile terminal 1 of the label identifier.

The primary application generates a primary request including a first characteristic information derived from said label identifier to the primary server 2. As previously explained, the first characteristic information must make it possible to identify the electronic shelf label 3 in the sales area, and can take the form of the label identifier alone, but this is not necessary, and it can be in a modified form. Thus, the data of the primary request exchanged between the mobile terminal 1 and the primary server 2 can be the same or else be different from those exchanged between the electronic shelf label 3 and the mobile terminal 1, the only requirement being the possibility of identification of the electronic shelf label 3 in the sales area.

Preferably, as illustrated in FIG. 4, and in order to limit the number of primary requests, the emission of the primary request is conditional on the fact:

that the determined time period has elapsed since the last interaction between the mobile terminal 1 and a secondary server or a primary server, or that the last secondary request has not been satisfied.

Thus, after the setting up of the communication via radio-frequency between the mobile terminal 1 and a radio-frequency peripheral 36 of an electronic shelf label 3 (step S1), the mobile terminal carries out a test (step S3) to know whether a determined time period has elapsed since the last interaction between the mobile terminal 1 and a primary server 2 or a secondary server 5. This determined time period corresponds to the duration of a typical purchase session of the sales area, and is for example of 20 or 30 minutes. The test (step S3) can also be carried out upon reception of the label identifier of an electronic shelf label 3.

If the determined time period has elapsed, it is possible that the user has changed sales area, and that a new piece of store chain information must be recovered by means of the subsequent step of emission of a primary request (step S4), in order to receive the piece of store chain information (step S5) required for the secondary request to be addressed to a secondary server 5 able to satisfy it. A time count is launched (step S6) on reception of a primary request This time count is re-initialized (step 10) on reception by the mobile terminal 1 of the data of a piece of information associated with the radio-frequency peripheral of the electronic label (step S9) in response to a secondary request. If no piece of store chain information has yet been received, the determined time period can be considered as having elapsed.

If the determined time period has not elapsed, it is probably that it is the same purchase session, and that consequently the piece of store chain information available is still valid.

Similarly, following the emission of a secondary request (step S7), a test is carried out (step S8) for the mobile terminal to determine whether or not the secondary request has been satisfied. If the secondary request has been satisfied, it is because the mobile terminal 1 has received (step S9) data representing a piece of information associated with the electronic shelf label 3 in response to its secondary request.

The secondary server 5 to which this secondary request has been sent has therefore been able to satisfy the request, i.e. it has been able to retrieve the data representing a piece of information associated with said electronic shelf label by means of the second characteristic information contained in the secondary request.

If the secondary server 5 to which this secondary request is sent cannot satisfy the request, this means that the user has change sales area, and that the label identifier that it has acquired corresponds to an electronic shelf label 3 of another distribution store chain, for which said secondary server does not have access to the second characteristic information. In this case, the secondary server 5 sends back an error message, and the test (step S8) of satisfaction of the secondary request is not successful.

This indicates that the piece of store chain information from which the secondary server 5 has been selected is not valid for this identifier, and therefore that a primary request must be emitted, even if the determined time period has not yet elapsed, in order for the mobile terminal 1 to receive the piece of store chain information that will allow it to send its secondary request to the right secondary server 5.

Consequently, if the determined time period has elapsed since the last interaction between the mobile terminal 1 and a secondary server or a primary server, or the last secondary request has not been satisfied, the mobile terminal 1 emits the primary request including said first characteristic information to a primary server 2 (step S4.)

The primary server 2 determines a piece of store chain information associated with said first characteristic information by searching for said first characteristic information, or else a form derived from it, in a database 4 to which said primary server 2 has access. In this database 4, each first characteristic information is associated with a piece of store chain information. Thus, this database makes it possible to identify the distribution store chain to which the electronic shelf label 3 identified by the first characteristic information derived from its label identifier, and hence to which distribution store chain the sales area in which the consumer who is acting on the mobile terminal 1 is attached. The presence of a remote primary server 2, or at least a remote database 4, can in particular be justified by the very large number of first characteristic information that these database 4 must contain, in the order of several hundred thousand, or even several millions, corresponding to the number of shelf labels 3 put into circulation in a geographical area. Furthermore, this remoteness makes it possible to ensure that the database 4 data are up to date.

The mobile terminal 1 then receives (step S5) from the primary server 5 the piece of store chain information associated with said first characteristic information in response to the primary request. The piece of store chain information can in particular comprise not only an indication concerning the identification of the distribution store chain, but also other information, such as for example the indication of a particular secondary server 5 associated with said distribution store chain, a barcode, or any other identifier, of the product associated with the electronic shelf label 3 or of the information intended for the customer, such as the price of said product, for example for displaying on the mobile terminal 1. The transmission of information intended for the customer in response to the primary request makes it possible in particular to ensure the correctness of the transmitted information, particularly in the case where the primary server collaborates or participates in the updating of the display of the electronic shelf label 3.

The primary application executed by the mobile terminal 1 then starts selectively a secondary application as a function of the piece of store chain information associated with said first characteristic information. This secondary application is also executed by the mobile terminal 1, and is typically specific to the distribution store chain identified by the piece of store chain information, or has even been developed specifically by or for this distribution store chain. Thus, the mobile terminal 1 generally possesses several secondary applications that can be started, each one associated with a piece of store chain information identifying a distribution store chain, and the primary application selectively starts the secondary application associated with the piece of store chain information. The primary application also transmits to the secondary application that starts the label identifier, the first characteristic information or else a second characteristic information derived from said label identifier, either upon start-up or after it.

The selection of the secondary application by the primary application on the basis of the piece of store chain information thus makes it possible to avoid the user having to be involved in this selection, by an operation transparent to the user since it requires no action from the latter, with the exception of bringing the mobile terminal 1 and the electronic shelf label 3 close to one another. It is also possible to provide for the primary application not to be visible to the user.

The secondary application is associated with at least one secondary server 5, so that the selective starting of the secondary application corresponds to the selection of at least one secondary server 5, this secondary server 5 being consequently selected on the basis of the piece of store chain information, since the latter has allowed the selection of the secondary application. The secondary application can be associated with a plurality of secondary servers 5, the secondary server 5 receiving the secondary request being selected on the basis of the piece of store chain information among the plurality of secondary servers 5 with which the secondary application is associated.

The second characteristic information must make it possible to identify the electronic shelf label 3 in the sales area, and can take the form of the single label identifier, but this is not necessary, and it can be a modified form thereof. Thus, the data of the secondary request exchanged between the mobile terminal 1 and the secondary server 5 can be the same or else be different from those of the primary request. Preferably, the second characteristic information allows the identification of the electronic shelf label 3 in the sales area, but it can correspond only to the product associated with the electronic shelf label identified by said label identifier. The second characteristic information can also comprise all or part of the piece of store chain information.

The secondary application therefore generates a secondary request including a second characteristic information derived from the label identifier, a secondary request intended for the selected secondary server. The mobile terminal 1 then emits (step S7) the secondary request including said second characteristic information to the secondary server 5.

The secondary server 5 has access to a database 6 comprising a plurality of second characteristic information derived from label identifiers, each of said second characteristic information being associated with data representing a piece of information associated with an electronic shelf label 3, said secondary server 5 being configured to communicate, in response to a secondary request including a second characteristic information of said plurality of second characteristic information, the data representing a piece of information with which said second characteristic information is associated.

Thus, the mobile terminal 1 receives (step S10) from the secondary server 5 data representing a piece of information associated with said electronic shelf label 3 in response to the secondary request. As explained above, a re-initialization (step S10) of the time count is then carried out.

Typically, these data representing a piece of information can correspond to supplementary information concerning an item associated with the electronic shelf label 3 in the sales area.

These data representing a piece of information associated with said electronic shelf label 3 can include data specific to the user of the mobile terminal 1, stored beforehand in a database 41, 44 accessible by a communication network.

For example, a database 41 can comprise a shopping list defined beforehand by the user, and the database 44 can comprise health data entered by the user, by means of which information on items can be matched with personal information, for example medical counter-indications such as the presence of allergens specified by the user and resident on his/her mobile terminal.

Other databases 42, 43 can be used, and in particular comprise the planogram, information relating to items, relating to the sales area, etc.

Thus, the electronic shelf label 3 can be used as a context sensor, since it makes it possible to determine the context of the mobile terminal 1 with which it is in communication, particularly spatial, temporal, and of use of the terminal.

It is hence possible to make provision for delivering to the mobile terminal 1 information relating to the item close to which the mobile terminal 1 is found, and therefore the user of said mobile terminal, particularly technical sheets, cooking recipes or else a suggestion of a substitute product or additional promotional offers.

It is also possible to include items with associated label identifiers that have been acquired by the mobile terminal 1, for example to display the total price of said items during a purchase session.

It is also possible to provide for updating a shopping list gradually with the acquisition of label identifiers associated with items on this shopping list.

It is also possible to implement a secure payment by means of the mobile terminal 1 using the reading of identifiers of electronic shelf labels 3 corresponding to the items that the user wishes to buy. A communication with a payment system when the user leaves the sales area then suffices.

In a preferential embodiment, following the receipt (step S2) of the radio-frequency peripheral identifier associated with the shelf label 3, and notwithstanding the emission or otherwise of a primary request, the mobile terminal 1 emits (step S7) a secondary request including a second characteristic information derived from said radio-frequency peripheral identifier to a secondary server 5, said secondary server 5 being selected on the basis of a piece of store chain information available beforehand for the mobile terminal 1.

Thus, if the piece of store chain information available for the mobile terminal 1, for example coming from a previous implementation of the method, is still valid, there is no need to wait for the response of the primary server 2 to the primary request to emit the secondary request.

Moreover, a user will typically acquire, within a fairly short space of time, by means of his/her mobile terminal 1, several identifiers of electronic shelf labels belonging to one and the same sales area, therefore attached to one and the same distribution store chain. It is then preferable to avoid the emission of primary requests since the piece of store chain information will indicate the same distribution store chain identification.

For this purpose, following the reception by the mobile terminal 1 of the piece of store chain information associated with the first characteristic information in response to the primary request, as described previously, the mobile terminal 1 directly emits secondary requests including second characteristic information derived from label identifiers to the secondary server 5 for the label identifiers subsequently received by the mobile terminal 1.

As explained above, a new primary request is then only emitted by the terminal after a determined time period has elapsed following a last interaction with a secondary server 5, for example the last reception by the mobile terminal 1 of data representing a piece of information associated with a radio-frequency peripheral 36 in response to a secondary request.

Preferably, the label identifiers subsequently received by the mobile terminal 1 following the reception of a piece of store chain information, and from which the secondary requests are directly emitted, are stored in a memory of the mobile terminal 1, said subsequently received label identifiers being time-stamped by the association of a piece of time information with each of said subsequently received label identifiers. These time-stamped label identifiers can then be transmitted to the primary server 2 at the same time as a primary request, emitted afterwards when the aforementioned conditions are met. This time-stamping makes it possible to know the purchasing journey of a user in a sales area, and the storage of the label identifiers makes it possible to implement a payment system based on this shopping list.

In this way, exchanges with the primary server 2 are limited. Furthermore, the primary application is only involved at the beginning of a purchase session. When the subsequent secondary requests are directly generated by the secondary application, it is enough for the primary application to register the label identifiers described above. The primary application is then only really re-launched at the expiry of the determined time period or when a secondary server 5 returns a failure in response to a secondary request.

The invention claimed is:

1. A method for communicating to a mobile terminal data representing a piece of information associated with a radiofrequency peripheral in an area equipped with a series of radiofrequency peripherals, each radio-frequency peripheral being identified by a unique radio-frequency peripheral identifier which is specific to said radio-frequency peripheral, said mobile terminal executing a primary application and possessing several secondary applications, each uniquely associated with a piece of store chain information in a memory of the mobile terminal, said method comprising at least the steps in which:

the mobile terminal sets up a communication via radio-frequency with a radio-frequency peripheral, the mobile terminal receives from the radio-frequency peripheral the radio-frequency peripheral identifier of said radio-frequency peripheral, the primary application generates a primary request including a first characteristic information derived from said radio-frequency peripheral identifier and the mobile terminal emits said primary request to a primary server, the mobile terminal receives from the primary server a piece of store chain information in response to the primary request, the first characteristic information being associated with said piece of store chain information in a store information database to which the primary server has access, the primary application automatically starts a secondary application upon receipt of the piece of store chain information, said secondary application being uniquely associated with said piece of store chain information in the memory, the secondary application generates a secondary request including a second characteristic information derived from said radio-frequency peripheral identifier and the mobile terminal emits said secondary request to a secondary server, said secondary server being selected on the basis of the piece of store chain information, and the mobile terminal receives from the secondary server data representing a piece of information associated with said radio-frequency peripheral, wherein following the reception by the mobile terminal of the piece of store chain information associated with said first characteristic information in response to the primary request, said mobile terminal directly emits secondary requests including second characteristic information derived from radio-frequency peripheral identifiers to the secondary server for the radio-frequency peripheral identifiers subsequently received by the mobile terminal, and wherein the primary application generates another primary request for a given radio-frequency peripheral identifier subsequently received by the mobile terminal only if:

a determined time period has elapsed since a most recent interaction between the mobile terminal and a primary or secondary server, or a prior secondary request has not been satisfied.

2. The method according to claim 1, wherein the secondary application is associated with a plurality of secondary servers, wherein the secondary server to which the secondary request is emitted is selected on the basis of the piece of store chain information among the plurality of secondary servers with which the secondary application is associated.

3. The method according to claim 1, wherein the radio-frequency peripheral identifier is an identifier of the label stored in the memory in said radio-frequency peripheral.

4. The method according to claim 1, wherein the first characteristic information sent to the primary server is the label identifier, and the second characteristic information sent to the secondary server is the label identifier.

5. The method according to claim 1, wherein if a determined time period has elapsed since the last interaction between the mobile terminal and a secondary server or a primary server, the mobile terminal emits a primary request including a first characteristic information derived from said given radio-frequency peripheral identifier to the primary server.

6. The method according to claim 1, wherein if the mobile terminal does not receive data representing a piece of information associated with a radio-frequency peripheral in response to a secondary request, the mobile terminal emits a primary request including a first characteristic information derived from said given radio-frequency peripheral identifier to the primary server.

7. The method according to claim 6, wherein notwithstanding the emission or otherwise of a primary request, the mobile terminal emits a secondary request including a second characteristic information derived from said given radio-frequency peripheral identifier to a secondary server, said secondary server being selected on the basis of a piece of store chain information available beforehand for the mobile terminal.

8. The method according to claim 3, wherein the radio-frequency peripheral identifiers subsequently received by the mobile terminal are stored in a memory of said mobile terminal, said radio-frequency peripheral identifiers being time-stamped by the association of a piece of time information with each of said radio-frequency peripheral identifiers subsequently received.

9. The method according to claim 8, wherein said time-stamped radio-frequency peripheral identifiers are then transmitted to the primary server at the same time as a primary request.

10. The method according to claim 1, wherein the mobile terminal communicates via the internet network with the primary server for the emission of the primary request including the first characteristic information and for the reception of the piece of store chain information associated with said first characteristic information.

11. The method according to claim 1, wherein the mobile terminal communicates via the internet network with the secondary server for the emission of a secondary request including the second characteristic information and for the reception of data representing a piece of information associated with said radio-frequency peripheral.

12. The method according to claim 1, wherein each radio-frequency peripheral is associated in a one-to-one manner with an electronic shelf label of a sales area, and wherein the radio-frequency peripheral identifier is a label identifier;

the data representing a piece of information associated with the radio-frequency peripheral are data representing a piece of information associated with the electronic shelf label.

13. A non-transitory computer program product comprising program code instructions for the execution of the steps of the method according to claim 1, when said program is executed by a mobile terminal.

14. A mobile terminal comprising means for communicating via radio-frequency with a radio-frequency peripheral, means for communicating with at least one primary server and at least one secondary server, data processing means, said mobile terminal comprising a memory which is configured to store associations between a unique secondary application and a piece of store chain information, said mobile terminal being configured to implement the method according to claim 1.

15. A communication system comprising:

a mobile terminal according to claim 14, a series of radio-frequency peripherals, each radio-frequency peripheral being identified by a unique radio-frequency peripheral identifier that is specific to said radio-frequency peripheral identifier, and the mobile terminal can set up a communication with each radio-frequency peripheral to acquire the radio-frequency peripheral identifier of said radio-frequency peripheral, at least one primary server having access to a database comprising a plurality of first characteristic information derived from each radio-frequency peripheral identifier, each of said first characteristic information being associated with a piece of store chain information, said primary server being configured to communicate, in response to a primary request including a first characteristic information, the piece of store chain information associated with said first characteristic information, at least one secondary server having access to a database comprising a plurality of second characteristic information derived from radio-frequency peripheral identifiers, each of said second characteristic information being associated with data representing a piece of information associated with a radio-frequency peripheral, said secondary server being configured to communicate, in response to a secondary request including a second characteristic information of said plurality of second characteristic information, the data representing a piece of information with which said second characteristic information is associated.

16. The method according to claim 1, wherein if the determined time period has not elapsed since the most recent interaction between the mobile terminal and a primary or secondary server, and if the prior secondary request has been satisfied, the method further comprises:

the mobile terminal starts the secondary application; and the secondary application generates another secondary request on the basis of a piece of store chain information available beforehand for the mobile terminal.

* * * * *